United States Patent
Kosako et al.

(10) Patent No.: US 7,720,365 B2
(45) Date of Patent: May 18, 2010

(54) PHOTOGRAPHIC DEVICE WITH ANTI-SHAKE FUNCTION

(75) Inventors: Kosei Kosako, Tokyo (JP); Masahiro Inazuka, Saitama (JP); Takuma Sato, Saitama (JP); Shinichi Kakiuchi, Saitama (JP); Shinya Suzuka, Saitama (JP)

(73) Assignee: Hoya Corporation, Tokyo (JP)

( * ) Notice: Subject to any disclaimer, the term of this patent is extended or adjusted under 35 U.S.C. 154(b) by 275 days.

(21) Appl. No.: 11/681,872

(22) Filed: Mar. 5, 2007

(65) Prior Publication Data

US 2007/0212041 A1 Sep. 13, 2007

(30) Foreign Application Priority Data

Mar. 7, 2006 (JP) ............................ 2006-060993

(51) Int. Cl.
G03B 17/00 (2006.01)
H04N 5/228 (2006.01)

(52) U.S. Cl. .................................. 396/55; 348/208.99
(58) Field of Classification Search ................... 396/55; 348/208.1, 208.99
See application file for complete search history.

(56) References Cited

U.S. PATENT DOCUMENTS

| | | | |
|---|---|---|---|
| 5,117,246 A * | 5/1992 | Takahashi et al. | 396/55 |
| 5,881,325 A * | 3/1999 | Imura et al. | 396/55 |
| 6,654,554 B2 | 11/2003 | Uenaka | |
| 2005/0052538 A1* | 3/2005 | Sato et al. | 348/208.1 |
| 2006/0177209 A1* | 8/2006 | Miyasako | 396/55 |

FOREIGN PATENT DOCUMENTS

| | | |
|---|---|---|
| JP | 8-87047 | 4/1996 |
| JP | 2000-321612 | 11/2000 |

OTHER PUBLICATIONS

U.S. Appl. No. 11/615,503 to Kosako et al., filed Dec. 22, 2006.
U.S. Appl. No. 11/625,891 to Kosako et al., filed Jan. 23, 2007.
U.S. Appl. No. 11/681,826 to Kosako, filed Mar. 5, 2007.
U.S. Appl. No. 11/681,913 to Kosako et al., filed Mar. 5, 2007.
English language Abstract of JP 8-87047.
English language Abstract of JP 2000-321612.

* cited by examiner

*Primary Examiner*—W. B. Perkey
*Assistant Examiner*—Noam Reisner
(74) *Attorney, Agent, or Firm*—Greenblum & Bernstein, P.L.C.

(57) ABSTRACT

A photographic device, includes a shake detector, a shake mitigator, a first commander, and a shake controller. The shake detector detects a device shake, that is, a shaking of the photographic device. The shake mitigator mitigates the effects of the device shake to reduce an image shake that is a shake of a photographed subject image. The first commander commands the photographic device to photograph the subject image. The shake controller controls the shake mitigator so that the shake mitigator refrains from mitigating the effects of the device shake from the point when the first commander commands the photographic device to photograph the subject image, until the point when photographing the subject image commences.

13 Claims, 3 Drawing Sheets

PHOTOGRAPHIC DEVICE WITH ANTI-SHAKE FUNCTION

BACKGROUND OF THE INVENTION

1. Field of the Invention

The present invention relates to a photographic device that has an anti-shake function, especially to a photographic device where the anti-shake function is controllable.

2. Description of the Related Art

Photographic devices which have an anti-shake function to prevent the effects of a shake caused by a hand shake, and so on, in a generated subject image have become widespread. For example, in digital cameras, anti-shake functionality is achieved by moving an imaging device or a photographing lens, or by other methods.

On the other hand, photographic devices such as digital cameras and video cameras usually have a display function to display a subject image. In these photographic devices, generally a shake-mitigated subject image can be displayed before the subject is photographed.

When a shake-mitigated subject image is displayed before the subject is photographed, a user cannot judge how much shaking of the photographic device occurs due to hand movement. Therefore, a user may not pay enough attention to satisfactorily mitigate camera shake, and a large amount of camera shake may occur. In such a case, image shake may not be adequately mitigated even though the anti-shake function is operated.

SUMMARY OF THE INVENTION

Therefore, the objective of the present invention is to provide a photographic device with an anti-shake function that can be controlled to prevent camera shake during photographing operation.

A photographic device, according to the present invention, includes a shake detector, a shake mitigator, a first commander, and a shake controller. The shake detector detects a device shake, that is, a shaking of the photographic device. The shake mitigator mitigates the effects of the device shake to reduce an image shake that is a shake of a photographed subject image. The first commander commands the photographic device to photograph the subject image. The shake controller controls the shake mitigator so that the shake mitigator refrains from mitigating the effects of the device shake from the point when the first commander commands the photographic device to photograph the subject image, until the point when photographing the subject image commences.

BRIEF DESCRIPTION OF THE DRAWINGS

The present invention will be better understood from the description of the preferred embodiment of the invention set forth below, together with the accompanying drawings in which.

DESCRIPTION OF THE PREFERRED EMBODIMENT

Hereinafter, the embodiment of the present invention is described with reference to the attached drawings.

Figure 1:
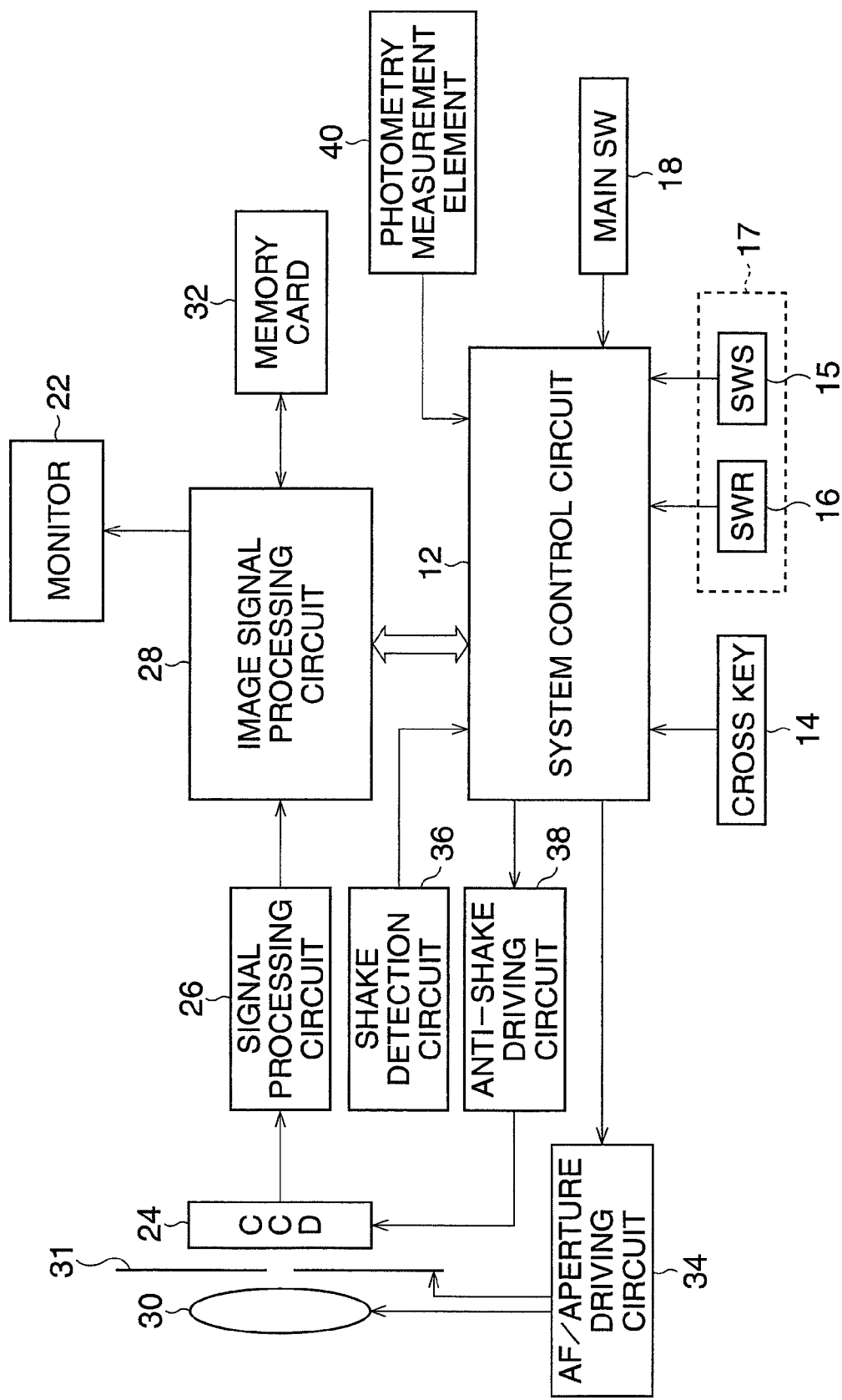
FIG. 1 is a block diagram of a digital camera of an embodiment of the present invention.

As shown in FIG. 1, in a digital camera of the present embodiment, a system control circuit 12 that controls the entire the digital camera is provided. The digital camera has a main switch Main SW 18, that, when turned on by an operation of a user, activates the system control circuit 12. Various components connected to the system control circuit 12, include a cross key 14, a photometry-measuring switch (SWS) 15, a release switch (SWR) 16, and so on. Signals corresponding to operations of these switches are transmitted to the system control circuit 12.

On a surface of the digital camera, a monitor 22 (an image display) to display a subject image is provided. The digital camera also includes various modes of operation, such as, a capture mode in which a subject is photographed and a still image of the subject is generated, an anti-shake mode in which a shake of an image is mitigated, and other modes which can be set by the operations of a menu button (not shown) and the cross key 14. When the capture mode is set, a subject image is displayed on the monitor 22 as a through image, before a still image is generated, as explained below.

First, a CCD 24 receives light reflected from a subject through a photographing lens 30; resulting in electric charges corresponding to a subject being generated in the CCD 24. The electric charges read from the CCD 24, that is, the image signals, are transmitted to a signal processing circuit 26. At the signal processing circuit 26, image signals undergo a noise reduction process before being converted from analog signals to digital signals. The processed image signals are transmitted to an image signal processing circuit 28.

In the image signal processing circuit 28, various processes, such as white balance adjustment, gamma correction, and so on, are carried out on the digital image signals, and then luminance signals and color-difference signals are generated. The generated luminance signals and color-difference signals, that is, the image data, are transmitted to the monitor 22 under the control of the system control circuit 12. As a result, a subject image is displayed on the monitor 22 as a through image.

When the release button 17 is half-depressed, the photometry-measuring switch 15 is turned on. When the photometry-measuring switch 15 is on state, distance-measuring and photometric operations are carried out by a distance measurement element (not shown) and a photometry measurement element 40 (a luminance measuring device), respectively. The distance and luminance data obtained from these operations are transmitted to the system control circuit 12. The system control circuit 12 controls an AF/aperture driving circuit 34 (a focus adjuster) for a focusing operation based on the distance data, and calculates an exposure value based on the luminance data.

When the release button 17 is fully depressed, the release switch 16 is turned on, and then the shutter speed and an aperture value for an aperture 31 are set by the system control circuit 12.

As a result, an aperture 31 is opened a predetermined amount, a shutter (not shown) is opened to a predetermined position for a predetermined time by the AF/aperture driving circuit 34 (an exposure controller) that is controlled by the system control circuit 12, and then the CCD 24 is exposed. Image signals are generated by the CCD 24, and read from the CCD 24. Based on the read image signals, a still image is generated and displayed on the monitor 22. The image data of a still image are stored in a memory card 32, and so on.

In the digital camera, a shake detection circuit 36 (a shake detector) that detects a shake of the digital camera is provided. In the shake detection circuit 36, a gyro sensor, a high-pass filter, and other elements (none of which are shown) are provided. The shake detection circuit 36 detects a shake by a known method. From the shake detection circuit 36, signals representing the magnitude of the detected shake are transmitted to the system control circuit 12.

Based on the signals output from the shake detection circuit 36, the system control circuit 12 transmits order signals to an anti-shake driving circuit 38 (a shake mitigator) to control the CCD 24 for shake reduction. The CCD 24 is slightly driven, that is, the CCD 24 is slightly moved in a direction perpendicular to the optical axis of the photographing lens 30 by a predetermined amount by the anti-shake driving circuit 38 to mitigate a shake of the digital camera and to reduce the effect of a shake on a photographed subject image. As a result, a shake of the digital camera is mitigated or canceled out by the movement of the CCD 24, and an image with a subject that does not bear the effects of a shake, can be generated.

Note that shake mitigation by the shake detection circuit 36 and the anti-shake driving circuit 38 is carried out while the anti-shake mode is set. That is, when the system control circuit 12 receives command signals to set the anti-shake mode, the shake detection circuit 36 and the anti-shake driving circuit 38 are activated by the system control circuit 12.

Therefore, a still image in which the image shake has been mitigated is generated in anti-shake mode. When the anti-shake mode is set, a through image in which the image shake has been mitigated is displayed on the monitor 22. When the anti-shake mode is not set, a through image in which the image shake has not been mitigated is displayed on the monitor 22, in principle.

Figure 2:
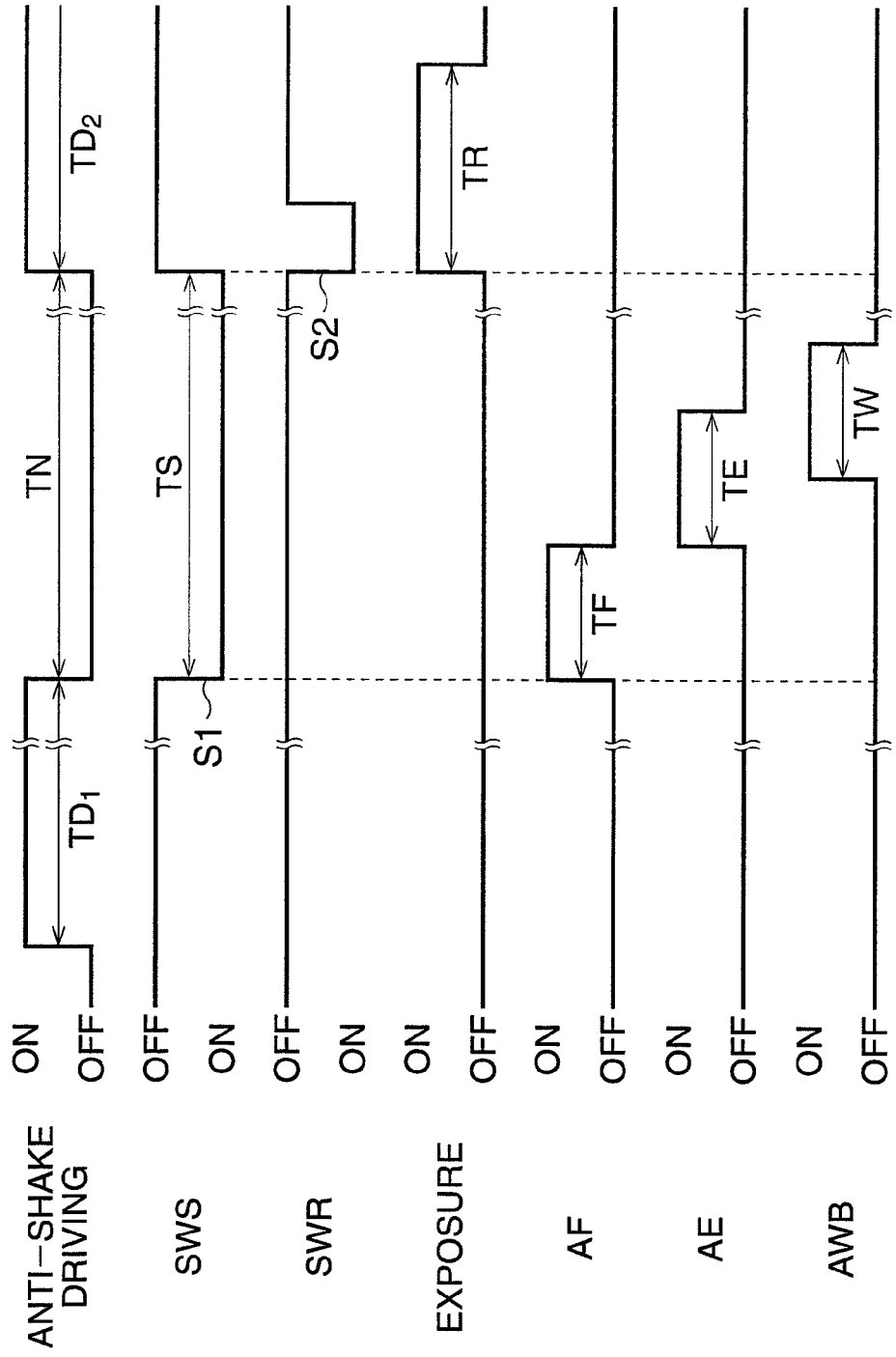
FIG. 2 is a timing chart representing operations for photographing an image in anti-shake mode.

In anti-shake mode, the shake detection circuit 36 and the anti-shake driving circuit 38 are on state, that is, anti-shake driving is on state in the first shake-mitigation period $TD_1$ (see FIG. 2). Then, when the photometry-measuring switch (SWS) 15 is turned on, command signals S1 to command measurement of luminance of a subject are transmitted to the system control circuit 12, which subsequently controls the shake detection circuit 36 and the anti-shake driving circuit 38 to discontinue operating. That is, the non-shake-mitigation period TN starts and the anti-shake driving circuit 38 is turned off, despite being in anti-shake mode.

Further, when the release switch (SWR) 16 is turned on instead of the photometry-measuring switch (SWS) 15, due to an operation of the release button 17, secondary command signals S2 to command photographing a subject are transmitted to the system control circuit 12. As a result, the photometry period TS ends, the exposure period TR begins, and the CCD 24 is exposed for generating a still image.

When the secondary command signals S2 to command photographing a subject are received by the system control circuit 12, it subsequently controls the anti-shake driving circuit 38, and so on, to be on state, thereby ending the non-shake-mitigation period TN and the photometry period TS at the same time. At the beginning of the exposure period TR, the second shake-mitigation period TD2 begins, and the anti-shake driving operation restarts under the control of the system control circuit 12.

As explained above, in the non-shake-mitigation period TN that immediately precedes the commencement of photographing a subject, the anti-shake driving operation switched to off state, and a through image in which shake mitigation efforts have not been carried out is displayed on the monitor 22. Therefore, a user can recognize how much camera shake occurs and can also recognize the need for reducing the cause of the camera shake, such as hand shake. Further, in the exposure period TR, the anti-shake driving is turned on again (in the second shake-mitigation period TD2), and a still image in which shake is mitigated or corrected can be generated.

During the non-shake-mitigation period TN in which the anti-shake driving circuit 38 stops functioning, focusing control (AF) in the focusing period TF, exposure control (AE) in the exposure control period TE, and white balance control (AWB) in the color control period TW are carried out automatically. These preparatory operations for photographing a subject end before the non-shake-mitigation period TN ends, so that a through image, whose quality has been adjusted except for shake mitigation, is displayed on the monitor 22 when photographing a subject is commanded by the operation of the release switch 16.

Figure 3:
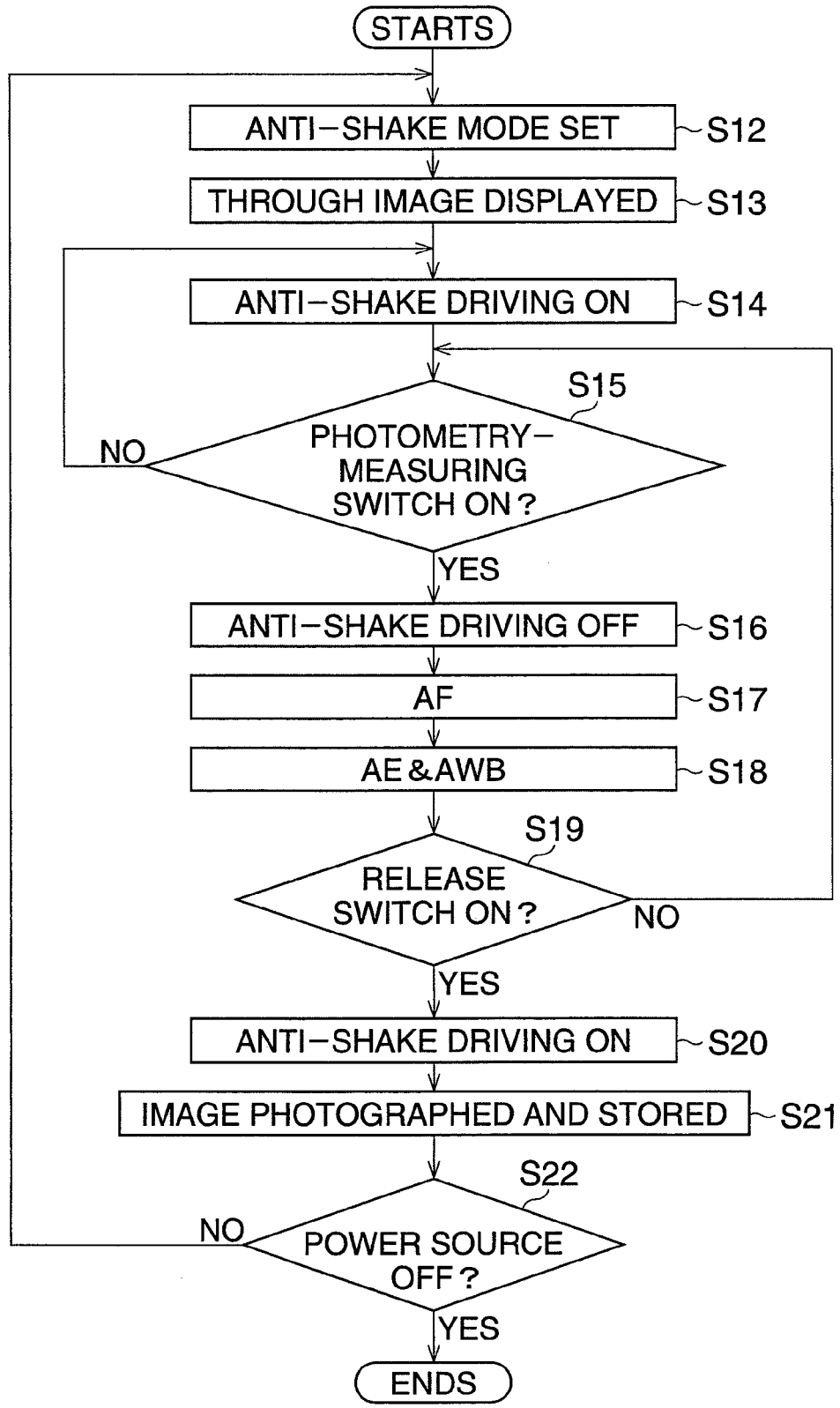
FIG. 3 is a flow chart representing a shake mitigation control routine.

The shake mitigation control routine (see FIG. 3) starts when the power source of the digital camera is turned on by operation of the main switch 18. At step S12, the anti-shake mode is set by operation of the cross key 14 and other buttons, after which the process proceeds to step S13. At step S13, a through image is displayed on the monitor 22, and then the process proceeds to step S14.

At step S14, the shake detection circuit 36 and the anti-shake driving circuit 38 are started, that is, the anti-driving operation is turned on and the process proceeds to step S15. At step S15, it is determined whether or not the photometry-measuring switch 15 is on state. When it is determined that the photometry-measuring switch 15 is on state, the process proceeds to step S16, otherwise the process returns to step S14. At step S16, the anti-shake driving is turned off and the process proceeds to step S17.

At step S17, the focus control operations are carried out and the process proceeds to step S18. At step S18, the exposure control operations and white balance adjustment are carried out, then the process proceeds to step S19. At step S19, it is determined whether or not the release switch 16 is on state. When it is determined that the release switch 16 is on state, the process proceeds to step S20, but when it is determined that the release switch 16 is off state, the process returns to step S15.

At step S20, the anti-shake driving operation is again turned on and the process proceeds to step S21. At step S21, a subject is photographed and a generated still image is stored in the memory card 32, then the process proceeds to step S22. At step S22, it is determined whether or not the power source of the digital camera is turned off. When it is determined that the power source of the digital camera is still on state, the process returns to step S12, but when it is determined that the power source is off state, the shake mitigation control routine ends.

As explained above, in this embodiment a subject image in which the effects of a shake are not mitigated is displayed just before photographing a subject to encourage a user to pay attention in order to reduce hand shake before taking a photograph, and the anti-shake operations are carried out when a subject is photographed to obtain a shake-mitigated subject image.

Although it is affixed to a digital camera in this embodiment, this device is not limited to use with a digital camera; that is, the anti-shake mechanism, including the shake detection circuit 36 and the anti-shake driving circuit 38, can be applied to other photographic devices that can generate an image. For example, the anti-shake mechanism may be adapted to a video camera, a silver-halide camera, and a cellular phone with a photographing function.

The preparatory operations for photographing, that are carried out in the non-shake-mitigation period TN, are not limited to focusing control (AF), exposure control (AE), and white balance control (AWB). For example, charging a flash may also be carried out in the non-shake-mitigation period TN. Further, not all of the operations for focus adjustment, exposure control, or white balance adjustment need be carried out, for example, one or two of these operations may be carries out.

In the present embodiment, the timing of the anti-shake driving operation by the anti-shake driving circuit 38 and other elements is synchronized to the point in time when the photometry-measuring switch 15 is turned on and just before the release switch 16 is turned on. However, the timing is not limited to this instant, and for example, the anti-shake driving operation may be stopped for a period that is after the all operations of the AF, AE, and AWB have ended, but before the release switch 16 is turned on. That is, the non-shake-mitigation period TN in FIG. 2 may be shortened, starting at or slightly later than the time when the color control period TW ends, and ending at or slightly earlier than the time when the exposure period TR begins.

By stopping the anti-shake driving operations after the operations of the AF, AE, and AWB ended, but before photographing a subject as mentioned above, the precision of the operations for the AF and so on can be improved because these operations are carried out on an image in which shake has been mitigated, thus enabling the speed of such operations to be increased. Note that in such a case, a through image whose quality has been adjusted for everything except shake mitigation is displayed on the monitor 22.

The shake mitigation function may be carried out under various situations, although it is carried out only when the anti-shake mode is set in this embodiment. For example, a switch for carrying out anti-shake operations can be provided, and shake mitigation may be carried out when the switch is on state. Further, the anti-shake mode may be set by the operation of such a switch instead of the menu button and the cross key 14.

The method of shake mitigation is not limited to the moving of the CCD 24 by the anti-shake driving circuit 38 and other elements that are adopted in this embodiment. For example, processing the image signals generated in the CCD 24, or driving the photographing lens 30 in a silver halide camera may also be used to reduce the effect of a shake on a subject image.

This invention is not limited to that described in the preferred embodiment, namely, various improvements and changes may be made to the present invention without departing from the spirit and scope thereof.

The present disclosure relates to subject matter contained in Japanese Patent Application No. 2006-060993 (filed on Mar. 7, 2006), which is expressly incorporated herein, by reference, in its entirety.

The invention claimed is:

1. A photographic device comprising:
a shake detector that detects a device shake that is a shake of said photographic device;
a shake mitigator that mitigates the effects of said device shake to reduce an image shake that is a shake of a photographed subject image;
a first commander that commands to photograph said subject image; and
a shake controller that controls said shake mitigator so that said shake mitigator, which is mitigating the effects of said device shake, refrains from mitigating the effects of said device shake from when said first commander commands to photograph said subject image until when photographing said subject image commences
wherein a period in which mitigation of the effects of said device shake is not performed is synchronized with a period in which photometry is performed, and
wherein the effects of said device shake are mitigated both before and after the period in which mitigation of the effects of said device shake is not performed.

2. The photographic device according to claim 1, further comprising:
a luminance measurement device that measures the luminance of a subject, an exposure controller that controls the exposure based on said luminance of said subject, and a second commander that commands said exposure controller to control said exposure, said shake controller controlling said shake mitigator so that said shake mitigator refrains from mitigating the effects of said device shake when said second commander commands said exposure controller to control said exposure.

3. The photographic device according to claim 2,
wherein said exposure controller controls said exposure during the period when said shake mitigator refrains from mitigating the effects of said device shake.

4. The photographic device according to claim 1,
wherein said shake controller controls said shake mitigator so that said shake mitigator restarts mitigating the effects of said device shake when photographing said subject image commences.

5. The photographic device according to claim 1, further comprising:
a photographing lens and a focus adjuster that adjusts the focus of said photographing lens, said focus adjuster adjusting the focus of said photographing lens during the period when said shake mitigator refrains from mitigating the effects of said device shake.

6. The photographic device according to claim 1, further comprising:
a white balance adjuster that adjusts the white balance of said subject image, said white balance adjuster adjusting the white balance of said subject image during the period when said shake mitigator refrains from mitigating the effects of said shake.

7. The photographic device according to claim 1, further comprising:
an image display that displays said subject image.

8. The photographic device according to claim 1, further comprising:
at least one of either an exposure controller that controls an exposure based on the luminance of a subject, or a focus adjuster that adjusts the focus of a photographing lens, or a white balance adjuster that adjusts the white balance of said subject image, said shake controller controlling said shake mitigator so that said shake mitigator refrains from mitigating the effects of said device shake from when an operation of said exposure controller or said focus adjuster or said white balance adjuster ends, until when photographing said subject image commences.

9. The photographic device according to claim 1, further comprising:
at least one of either an exposure controller that controls an exposure based on the luminance of a subject, or a focus adjuster that adjusts the focus of a photographing lens, or a white balance adjuster that adjusts the white balance of said subject image, said exposure controller, or said focus adjuster, or said white balance adjuster operating during the period when said shake mitigator refrains from mitigating the effects of said device shake.

10. The photographic device according to claim 1, wherein the period in which mitigation of the effects of said device shake is not performed begins together with the period in which photometry is performed.

11. The photographic device according to claim 1, wherein the period in which mitigation of the effects of said device shake is not performed ends together with the period in which photometry is performed.

12. The photographic device according to claim 1, wherein the period in which mitigation of the effects of said device shake is not performed begins and ends together with the period in which photometry is performed.

13. The photographic device according to claim 1, wherein a duration of the period in which mitigation of the effects of said device shake is not performed is the same as a duration of the period in which photometry is performed.

* * * * *